July 26, 1960

A. RYBA 2,946,419

ELECTROMAGNETIC FRICTION CLUTCH

Filed Oct. 15, 1958

INVENTOR.
ANTON RYBA
BY Hans and Nydick
ATTORNEYS

[2,946,419]

Patented July 26, 1960

2,946,419
ELECTROMAGNETIC FRICTION CLUTCH

Anton Ryba, Bolzano, Italy, assignor, by direct and mesne assignments, to Zahnradfabrik Friedrichshafen, Friedrichshafen, Germany, a corporation of Germany Filed Oct. 15, 1958, Ser. No. 767,451

Claims priority, application Austria Oct. 18, 1957

4 Claims. (Cl. 192—84)

The present invention relates to a magnetically operated coupling or brake for releaseably coupling a driving member and a driven member, which is capable of transmitting a moment in either rotational direction independently of the direction of the flow of energy and the rotational direction of the driving member and which is equipped with automatic adjustment compensating for wear, the adjustment being effected by means of right hand and left hand threads on coacting coupling components free to turn into the direction compensating for wear but blocked in the reverse direction by locking means.

It is an object of the invention to provide a coupling or brake of the general kind above referred to, which affords all the features of such couplings as heretofore known, yet is considerably simpler in design and structure and hence less expensive in manufacture and maintenance.

Another object of the invention is to provide a coupling or brake of the aforesaid type which is very compact in structure, reliable in operation and more efficient than couplings of this kind as heretofore available.

Other objects, features and advantages of the invention will be pointed out hereinafter and set forth in the appended claims forming part of the application.

In the accompanying drawing, several preferred embodiments of the invention are shown by way of illustration and not by way of limitation.

Figure 1:
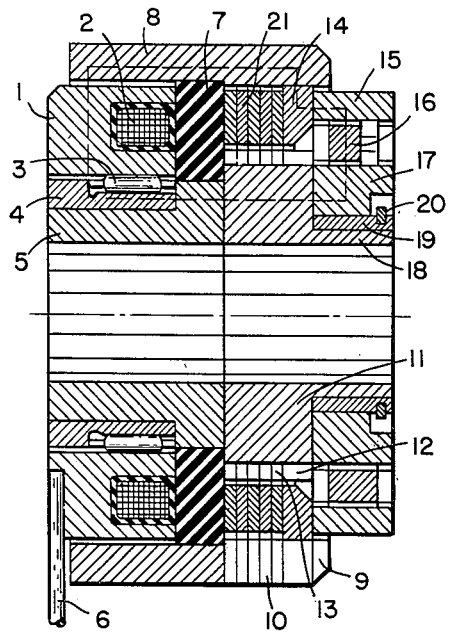
Fig. 1 is a sectional elevational view of a coupling according to the invention.

Referring first to Figs. 1 and 3 to 5 in detail, the coupling exemplified in these figures comprises a magnetic body 1 made of suitable ferromagnetic material. The magnetic body is provided with a circumferential groove in which is seated an exciting coil 2 by means of a hardened insulation mass. The magnetic body is rotatably seated upon a ferromagnetic bushing 5 by means of a roller bearing 3, 4. During operation, the magnetic body may be held stationary by means of a suitable linkage indicated as arm 6. This affords the advantage that the exciting coil also remains stationary so that it can be connected directly to a source of current without the use of slip rings. Bushing 5 is secured to a ferromagnetic ring 8 by means of an intermediate non-magnetic ring 7. Ring 8 has in its inner periphery several circumferential grooves in which are fitted outer friction discs 10 by means of suitable radial protrusions or teeth thereon. The inner friction discs 13 which coact with friction discs 10 are seated in circumferential grooves 12 formed in the outer periphery of a ferromagnetic ring member 11. Friction discs 10 and 13 constitute a friction assembly 21. Five friction discs are shown, but any higher or lower number of discs may be provided. A ferromagnetic ring disc 14 is disposed on the side of the friction assembly opposite to the side facing ring 7. Ring 14 engages grooves 9 formed in the inner periphery of magnetic ring member 8. Both the friction discs and the ring 14 are thus secured against rotation relative to the respective members in which they are fitted, but can slide in axial direction.

The coupling further comprises an armature which serves to close the magnetic flux lines and also to compensate automatically for the wear experienced by the friction discs during use of the coupling. The armature is composed of three concentric rings all made of ferromagnetic material, more specifically, an outer ring 15 having inner peripheral threads, an intermediate ring 16 having inner and outer peripheral threads and an inner ring 17 having outer peripheral threads. Armatures 15, 16 and 17 is seated upon a flange 18 axially extending from ring member 11. A non-magnetic bushing 19 force-fitted upon flange 18 is preferably interposed between armature ring 17 and flange 18. Ring 17 and with it the entire armature are seated on the bushing 19 axially slideable and rotatable. A stop member 20 such as a circlip limits axial displacement of the armature and prevents the same from slipping off its bushing.

Rings 15, 16 and rings 17, 16 are in mesh by threads of the opposite hand. For the function of the coupling it does not matter which pair of rings is coupled by threads of the right hand and threads of the left hand. It is only essential that the threads are of the opposite hand.

Rings 15 and 17 are further coupled to the intermediate ring 16 by means of unidirectionally acting locking means. These locking means are shown as locking teeth 22 and 23 which extend across the entire width of the respective threads as is clearly shown in Fig. 5 for teeth 23 on ring 17. The teeth are circumferentially spaced. Any number of teeth may be provided, the more teeth are provided the finer compensation is obtained, as will be more fully explained hereinafter. The teeth are shown as coacting with pawls 24, 25, 26 and 27 mounted on intermediate ring 16. The pawls are formed of leaf springs fixedly secured for part of their length to ring 16. The free ends of the springs protrude into circumferentially elongated recesses 28 on the peripheral surface of ring 16 as can best be seen in Fig. 4. The protruding ends of the springs are movable within recesses 28 and terminate in hooks which are so slanted that they will engage the teeth 22 and 23 in one direction, but will slide over the teeth in the opposite direction. As is evident, the arrangement of the locking means may be reversed from that shown in the figures by providing the teeth on intermediate ring 16 and the pawls on rings 15 and 17.

The discs forming the friction assembly 21 may be made of any material suitable for the purpose, but precautions must be taken that the magnetic field which is indicated in Fig. 1 by dotted lines does not close prematurely through the friction assembly. When for instance the friction discs are made of ferromagnetic material, the mass of the material should be disposed sufficiently distant from grooves 12 in ring member 11 and the protrusions with which the inner discs 13 engage the ring grooves should be sufficiently long so that an air gap is formed between the disc assembly and ring member 11 which is sufficiently wide to provide the necessary magnetic resistance. It is also possible to interpose a bushing of non-magnetic material between ring member 11 and friction discs 13. This bushing is then fixedly secured to ring member 11 and is formed with the grooves for seating the inner discs 13. It is also practical to make the discs of non-magnetic material, for instance, friction discs may be used which have a sintered coating on a bronze base. In any event, it is essential for high efficiency that the magnetic flux lines flow from ring member 11 through the armature without material magnetic shunt flux or leakage.

The operation of the coupling as heretofore described, is as follows:

When exciting coil 2 is energized, a magnetic field is generated in the coupling which follows essentially the dotted line. As a result, ring 17 is attracted against ring 11 and ring 15 against ring 14. Ring 11 should be visualized as receiving one of the members to be coupled and ring 5 the other member to be coupled so that rings 5 and 11 can rotate only in unison with the respective members to be coupled. As has been previously explained, ring 14 is coupled to ring 5 through rings 8 and 7 so that it cannot rotate relative to ring 5.

If upon attraction of the armature rings toward and against rings 14 and 11, the disc assembly 21 is displaced into adequate frictional engagement, the two coupling members are fully coupled and no compensatory action is necessary. However, if the friction discs do not move into sufficient frictional engagement, which will be the case when the friction discs have become worn due to use, rings 15, 16 and 17 will tend to rotate relative to each other.

As also previously explained, rings 15 and 17 are coupled with intermediate rings 16 through threads of the opposite hand and further through the unidirectionally acting locking means. As a result, neither one of rings 15 and 17 can rotate in the direction which would turn it away from rings 14 and 11 respectively, but ring 15 must turn relative to ring 17 always in the same direction, namely in the direction toward ring 14 and the disc assembly, irrespective of the prevailing rotational direction. As soon as the friction discs are thus moved into frictional engagement sufficient to transmit force, the disc assembly will take over part of the rotational moment to be transmitted from the driving member and the driven member. The distribution of the total rotational moment to be transmitted between the friction assembly and the engagement of the armature with rings 11 and 14 by magnetic attraction depends upon the friction factor at the force transmitting surfaces between rings 11, 17 and rings 15, 14 respectively. It also depends upon the pitch and the friction in the threads on rings 15, 16 and 17 and finally upon the median radii of the component of force.

When the exciting coil is de-energized, the coupling becomes immediately disengaged and remains exactly in the adjustment which it had just before the de-energization of the coil. During operation, compensation of the wear of the discs is continually and automatically effected by ring 15 creeping toward the discs as the total axial thickness of the disc assembly becomes diminished by wear.

Figure 2:
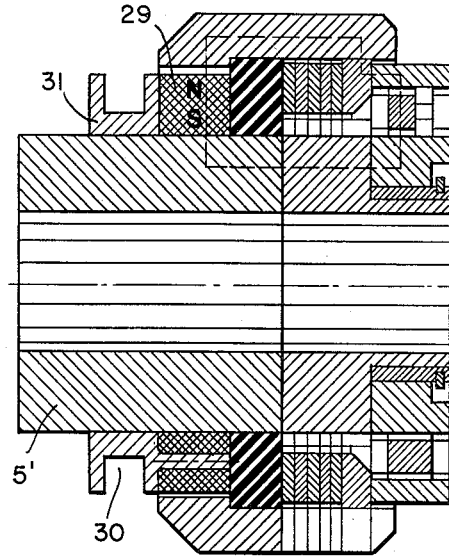
Fig. 2 is a similar sectional view of a modification of the coupling.
Figures 3, 4, 5:
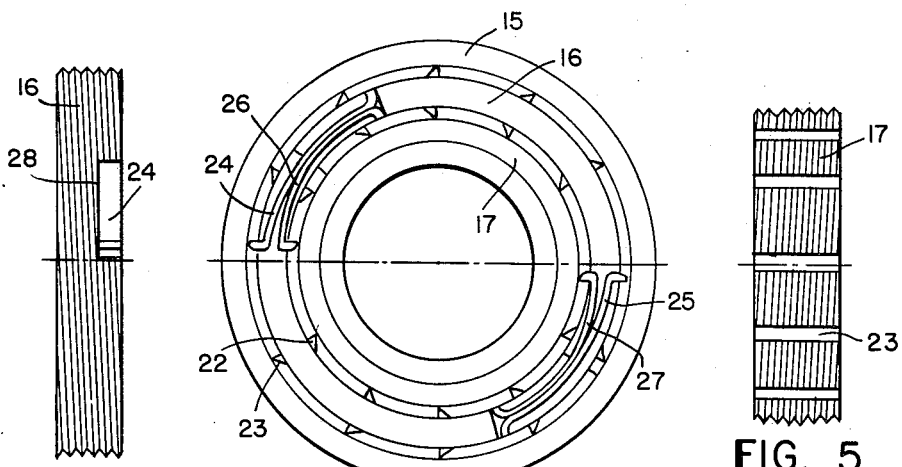
Fig. 3 is a front view of the armature of the coupling according to Figs. 1 and 2.
Fig. 4 is a side view of one of the rings of which the armature is composed.
Fig. 5 is a side view of another ring of the armature.

The exemplification of the coupling shown in Fig. 2 is similar in principle to that of the coupling of Fig. 1, except that the magnetic field is generated not by an electromagnet but by a permanent magnet 29. The magnetic field is essentially the same as that of Fig. 1 and is indicated by a dotted line. The operation of the coupling and the automatic compensation will be evident from the previous description. It suffices to state that the coupling is engaged when magnet 29 is in the position shown in Fig. 2. To release the coupling, the magnet is withdrawn by inserting a suitable lever or arm in a circumferential groove 30 in a ring member 31 slideable on ring 5' upon which it is seated. As is evident, withdrawal of the magnet towards the left from the position shown will cause a practical collapse of the magnetic field.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modfications in the appended claims.

What is claimed as new and desired to be secured by Letters Patent is:

1. A magnetically operated coupling for releasably coupling a driving member with a driven member, said coupling comprising a magnetic body, a first coupling member rotatable in either direction for receiving one of the members to be coupled, a second coupling member rotatable in either direction for receiving the other member to be coupled, at least one pair of frictionally engageable discs, one of said discs being secured to the first coupling member and the other to the second coupling member for joint rotation in either direction, frictional engagement of said two discs coupling the two coupling members, and an armature seated rotatably and axially slidably on one of said coupling members in a position such that magnetic flux lines generated in said magnetic body close through said armature for attracting the same into frictional force transmitting engagement with both said coupling members and toward the friction discs, said armature comprising three concentric ferromagnetic rings, one of said rings coacting with said friction discs to move the same into frictional engagement, the middle one of said rings having outer and inner peripheral threads of the opposite hand engaging corresponding right hand and left hand inner and outer peripheral threads on the outer and inner rings respectively, to provide for turning of the inner and outer rings relative to each other in either direction, and unidirectionally but oppositely acting locking means between the middle ring and inner and outer ring respectively to lock the inner ring to either one of the other rings depending upon the rotational direction of the driving member to be coupled, whereby upon magnetic attraction of the armature the armature ring coacting with said frictional discs is always restricted to turning relative to the other rings in the direction toward said frictional discs to compensate for any wear thereof irrespective of the rotational direction of the driving member to be coupled.

2. A coupling according to claim 1 wherein the outer armature ring coacts with said friction discs.

3. A coupling according to claim 1 wherein a ring portion is provided on one of said coupling members, said ring portion being interposed between said friction discs and said outer ring of the armature and being axially displaceable, magnetic attraction of the armature moving said outer armature ring into force transmitting engagement with said ring portion to urge the latter toward the friction discs and also moving the inner armature ring into force transmitting engagement with the other coupling member.

4. A coupling according to claim 1 wherein said locking means comprises recesses in one of the coacting armature rings and springy pawls in the respective other coacting ring, a plurality of circumferentially spaced locking means being provided between each two coacting rings.

References Cited in the file of this patent

UNITED STATES PATENTS

| 1,056,242 | Whitcomb | Mar. 18, 1913 |
| 2,692,035 | Rabinow | Oct. 19, 1954 |
| 2,724,281 | Summers et al. | Nov. 22, 1955 |

FOREIGN PATENTS

| 197,151 | Austria | Apr. 10, 1958 |